3,178,495
PROCESS FOR THE PRODUCTION OF THERMOPLASTIC FILMS

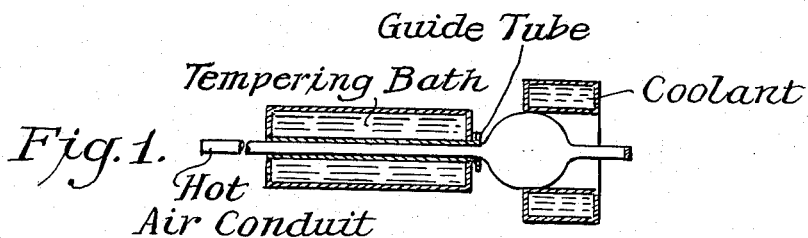
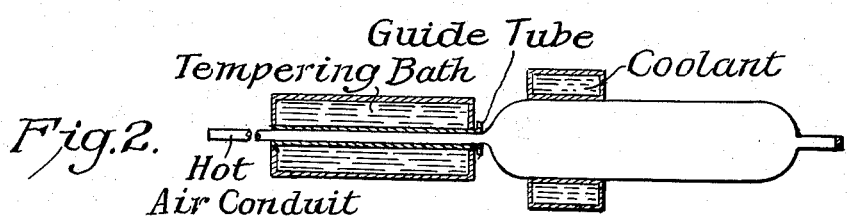
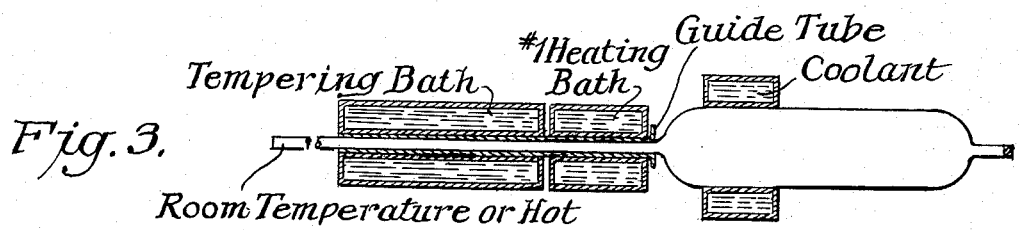
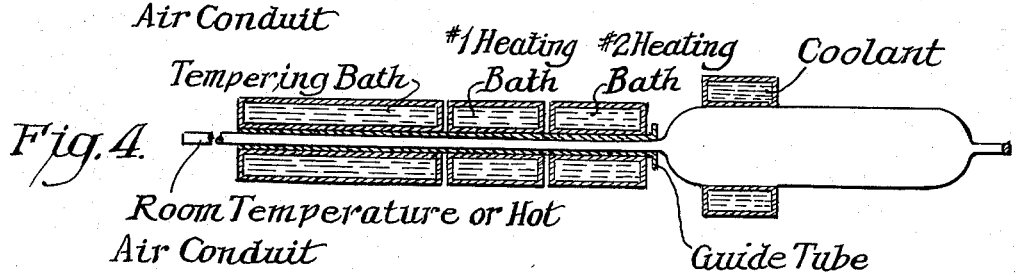

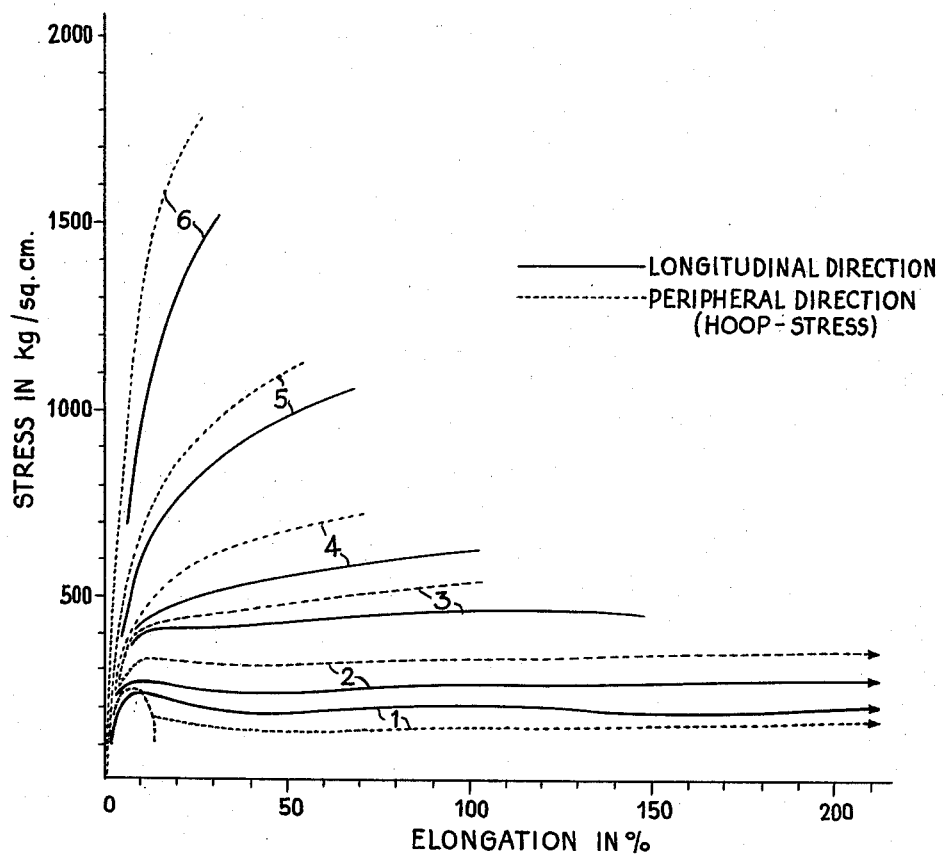

Kurt Richard, Bad Soden, Taunus, Georg Diedrich, Neuenhain, Taunus, and Erwin Gaube, Kelsterbach (Main), Germany, assignors to Farbwerke Hoechst Aktiengesellschaft vormals Meister Lucius & Brüning, Frankfurt am Main, Germany, a company of Germany
Filed Oct. 9, 1961, Ser. No. 143,742
Claims priority, application Germany, Oct. 13, 1960, F 32,328
4 Claims. (Cl. 264—95)

The present invention relates to a process for the production of thermoplastic films.

U.S. Patent No. 2,952,867 provides a process for the manufacture of films of macromolecular thermoplastic material according to which a tube of macromolecular thermoplastic material is spherically expanded by internal pressure to cause orientation in all directions and a tubular film is prepared by hemi-spherically expanding the whole of the tube by the same amount, the expansion starting from the posterior hemi-spherical zone of transition between the tube and the expanded portion of the tube. The essential condition of the spherical expansion causing orientation in all directions is that the tube to be expanded has a temperature within the range of the crystallite melting point or softening point of the material constituting the tube to 60° C. below the said point. The process of that specification enables films to be prepared which have a thickness within the range of about 0.3 to 0.01 mm. and strength values of a few hundred kg./sq. cm. to about 3000 kg./sq. cm. in all directions. The strength thus achieved depends on the stretching temperature and the degree of expansion.

According to this dependency films can be obtained which have strength values within the range of those of an unstretched film and those of the films prepared according to the process described in the above-mentioned specification and which consequently possess an improved elongation or toughness, provided that care is taken that during the whole expansion operation the material has a temperature near or equal to the crystallite melting point. It is, however, difficult to keep the temperature exactly within the said range during the whole of the stretching operation.

The present invention is based on the observation that films having an increased strength and an improved toughness can be prepared by carrying out the expansion in the manner described in the above-mentioned specification and by taking care that at the beginning of the expansion only a concentrical part of the cross-sectional area of the tube has a temperature within the range of the crystallite melting point to 60° C. below this point while at the same time another concentrical part of the cross-sectional area of the tube has a temperature which is above the crystallite melting point. The last-mentioned portion of the cross-sectional area of the tube may also have a temperature near or below the crystallite melting point. In this case it is, however, necessary that this portion of the cross-sectional area of the tube is not crystallized but molten.

In order to create in the tubular material the conditions of temperature which are required for the expansion according to the invention the tube to be expanded can be passed, for example, through a tempering bath as is described in the above-mentioned specification. Immediately before the beginning of the expansion the outer wall of the tube can be heated to a temperature above the crystallite melting point, for example, by passing the tube through an additional bath having an elevated temperature or by blowing the tube leaving the tempering bath with a hot gas or by spraying it with a hot liquid or by heating it by radiation. In an analogous manner the inner wall of the tube may also be heated to an elevated temperature.

The temperature of the heating agents serving to heat a part of the cross-sectional area of the tube to a temperature above the crystallite melting point or softening point and the period during which the said heating agent is to act upon the tube depend on the thickness of the tube and on the properties that are to be imparted to the tubular film to be prepared. When a liquid bath is used its temperature is advantageously by at least 5° C. above the crystallite melting point or softening point of the material constituting the tube, that is to say when a tube of low pressure polyethylene is treated the temperature of the liquid bath is at least about 130° C. The upper permissible temperature limit of such a heating bath is only set by the boiling point of the liquid of the heating bath and by the thermal stability of the material of the tube. For reasons of economy, a temperature of about 60° C. above the crystallite melting point or softening point of the material constituting the tube will in general not be exceeded. In special cases, for example, in continuously working equipments operating at a very high speed, higher bath temperatures may be applied. In cases in which a hot gas, for example, air, is used to heat a portion of the cross-sectional area of the tube the temperature range that may be applied has approximately the same limits. However, due to the poor heat capacity of gases the upper limit can be exceeded without hesitation and, for example, air having a temperature of or above 300° C. may be blown against the tube.

The residence time of the tube in the heating device used for the above-mentioned subsequent heating depends on the temperature prevailing in the heating device and on the properties to be imparted to the films to be prepared. The residence time is the longer the lower the temperature of the heating device. Besides, it is the longer the greater the desired toughness of the film. In general a residence time within the range of a few seconds, for example, 5 seconds, to some minutes, for example, about 20 minutes, will be sufficient. However, in special cases, the residence time may exceed the said limits to a large extent.

Another way of realizing the distribution of temperature according to the invention within the cross-sectional area of the tube consists in cooling a tube leaving an extruder at a temperature above the melting or softening point of the thermo-plastic material, for example, at about 200° C., from the outside to such an extent that the outward parts of the cross-sectional area of the tube are cooled to a temperature within the range of the crystallite melting point or softening point to 60° C. below said point while the inner parts maintain a temperature above the crystallite melting point or softening point, and then expanding the tube in this state.

The other measures of the process can be carried out in the same manner as described in the above specification.

The process of the present invention may be carried out on all thermoplastic materials presenting the phenomenon of "necking" as is described in the above specification. As examples of such materials there may be mentioned polyvinyl chloride, polyfluoroethylenes and polyolefines, for example, polyethylene, polypropylene and polymers of olefines of high molecular weight. The process may also be carried out on copolymers of the monomers on which the said thermoplastic materials are based and/or other monomers, provided that these polymers possess the property of "necking." The process is especially advantageous for the processing of low pressure polyolefines, for example, those prepared by the polymerization of olefines under mild conditions of pressure and temperature by means of catalyst systems as are known under the name of "Ziegler catalysts."

In some cases it may be suitable to subject the omni-directionally stretched films which have been prepared according to the invention to a further stretching operation at a lower temperature.

Depending on the conditions of their preparation the films prepared according to the process of the invention have strength values within the range of about 1000 to about 200 kg./sq. cm. and accordingly elongation values within the range of about 50 to several hundred percent, for example 500%. The values of strength and elongation of the films obtained can be adjusted in any way by a variation of the distribution of the temperature within the cross-sectional area of the tube which may be brought about, for example, by adjustment of the bath temperature or the velocity at which the tube is fed into the tempering baths or by a corresponding regulation of other tempering devices, if such are used.

The accompanying drawing schematically shows in FIGS. 1 and 2 the process according to the invention. FIG. 1 shows the beginning of the inflating process, wherein a sphere is formed by inflating one end section of the tube, one concentric portion of the cross-sectional area of which is particularly at a temperature within the range between crystallite melting point of the thermoplastic material and 60° C. below said point and the other portion is within the range between the crystallite melting point and a temperature above the crystallite melting point. FIG. 2 shows the same tube in a further stage of the process. The inflated zone has been extended by progressively and hemispherically inflating those parts of the tube which are immediately adjacent to the sphere formed in FIG. 1.

In FIGS. 1 and 2 the temperature differential within the cross-sectional area is obtained by passing the tube through a tempering bath which is at a temperature between the crystallite melting point and 60° C. below that point. Hot air is passed through the hot air conduit in order to bring the interior portion to a temperature above the crystallite melting point. Naturally the temperatures may be reversed (i.e., the tempering bath may be at a temperature higher than the crystallite melting point while the hot gasses are at a temperature sufficient to bring the interior temperature between the crystallite melting point and 60° C. below said point).

In FIG. 3 the temperature differential is illustrated as obtained by the use of two heating baths. The first bath (tempering bath) heats the tube to between the crystallite melting point and 60° C. below this point. The second bath heats only the outer surface of the tube above the crystallite melting point. The second bath is characterized by a residence time sufficient to assure only the outer portion of the tube reaches a temperature above the crystalline melting point. The same procedure may be utilized as described above, but the tube may be heated from both the inside and outside by the second heating bath. By this means, both the interior and exterior of the tube are heated to the molten stage while the center of the tube remains at a temperature between the crystallite melting point and 60° C. below this point.

In FIG. 4 the temperature differential is obtained by three separate heating baths. The tempering bath is at a temperature above the crystallite melting point, the first heating bath is below the crystallite melting point while the third and final bath is above the crystallite melting point.

FIG. 5 illustrates in graphic form the results obtained according to the invention. The curves plot the elongation of films prepared by various processes against the stress applied thereto. A detailed description of the films and processes utilized appears in the subsequent examples.

The following examples serve to illustrate the invention but they are not intended to limit it thereto.

Example 1

(Comparison test)

A film of low pressure polyethylene was prepared according to the known film blowing process. By means of a commercial extruder provided with an annular die of a diameter of 60 mm. and a width of opening of 0.5 mm. a tube was made by extruding low pressure polyethylene. The tube which left the annular die at a temperature of 210° C. was expanded immediately after leaving the annular die by inner overpressure to three times its diameter (180 mm.) and was simultaneously drawn off by a drawing-off device. The expansion was carried out in the molten state and served to reduce the wall thickness of the extruded tube to such an extent that a thin film was obtained from the comparatively thick-walled tube. After the expansion the finished tube cooled and solidified (crystallized).

The film had a yield point within the range of 220 to 250 kg./sq. cm. (cf. curves 1 of the accompanying graph). When stressed in a longitudinal direction the film expanded almost uniformly and almost without any local necking taking place by several hundred percent. In contradistinction thereto, when the film was subjected to stress in a transverse direction, a marked local necking occurred after the yield point had been exceeded and the film tore easily, especially when exposed to rapid and shock-like stress (cf. the fall of stress-elongation curve 1 of the graph). This pehnomenon is a grave inconvenience of the commercial blown film made of low pressure polyethylene. The different behaviour of the film when stressed in a longitudinal and in a transverse direction is due to the flow orientation present in the longitudinal direction of the tube used as starting material and produced during its preparation on the extruder.

Example 2

(Comparison test)

A film of low pressure polyethylene was prepared according to the process described in the above specification, the expansion being carried out at a temperature below the crystallite melting point of the material, which was at 128° C. As starting material a tube was used which had an outside diameter of 32 mm. and a wall thickness of 2 mm. The said tube was conducted into a liquid tempering bath and there heated to a temperature of 125° C. Immediately after leaving the tempering bath the tube was subjected to a successive hemi-spherical expansion (ratio: 1:10) and thereby transformed into a tubular film of a diameter of 300 mm. By the hemi-spherical expansion which was carried out at a temperature below the crystallite melting point the strength was considerably improved.

A film prepared in this manner had a strength of about 1800 kg./sq. cm. in the transverse direction and of about 1500 kg./sq. cm. in the longitudinal direction and an elongation of 20 to 40% (cf. curves 6 of the graph). When the starting material was heated to 127° C. and expanded in the manner described the strength of the resulting films was a little poorer (for example, 1000 to 1500 kg./sq. cm.) but their elongation was somewhat higher (for example, 30 to 60%).

Example 3

A tube was expanded in the manner described in Example 2 (comparison test) but, in addition to the measures mentioned in that example, the sphere (wide portion of the tube) was blown from the inside with hot air of about 130° C. The films thus obtained had a strength of 800 to 1100 kg./sq. cm. and an elongation of 50 to 80% (cf. curves 5 of the graph).

Example 4

A tube of low pressure polyethylene (crystallite melting point 127° C.) which had an outside diameter of 32 mm. and a wall thickness of 2 mm. was heated at its exterior surface in a tempering bath in glycol of 126° C. for 5 minutes. Subsequently it was heated, likewise at its exterior surface, for 30 seconds in a glycol bath of 170° C. and then spherically inflated and thereby transformed into a tubular film having a diameter of 300 mm. The film had a thickness of about 20μ. Its yield point was at 330 kg./sq. cm. in the peripheral direction and at 270 kg./sq. cm. in the longitudinal direction. Its elongation at break amounted to several hundred percent in all directions. Samples of the film material did not undergo local reduction in thickness during stretching or did so only very slightly. After exceeding the yield point the stress elongation curve had but a poor fall and became almost a horizontal line (cf. curves 2 of the graph). In addition to a good elongation, films of this kind have a high notched tear strength.

*Example 5*

A tube of the kind described in Example 4 was heated for 2 minutes from the outside and from the inside in glycol having a temperature of 126° C., for 15 seconds from the inside and the outside in glycol having a temperature of 160° C. and it was subsequently expanded in the manner described in Example 4. The results were similar to those obtained according to Example 4 and corresponded to curves 2 of the graph.

*Example 6*

A tube of the kind described in Example 4 was heated from the inside and from the outside for 1 minute in glycol having a temperature of 140° C., then for another minute in glycol having a temperature of 126° C. and then again for 10 seconds in glycol of 140° C. The tube was then inflated in the manner described in Example 4. The results were similar to those obtained according to Example 4 (cf. curves 2 of the graph).

In the experiments described in Examples 4 to 6 air having room temperature was used for the expansion. There may, however, also be used hot air, for example, air having a temperature of up to 250° C., in which case the bath temperature may be somewhat lower or the residence time in the baths may be shorter.

*Example 7*

A tube of low pressure polyethylene (crystallite melting point 128° C.) which had an outside diameter of 32 mm. and a wall thickness of 3 mm. was heated for 6 minutes from the inside and from the outside in glycol having a temperature of 128° C. and for another 20 seconds from the inside and from the outside in glycol of 140° C. and subsequently spherically expanded with air having room temperature until its diameter amounted to 400 mm. The film had a thickness of about 20μ. Its yield point was at about 400 kg./sq. cm. in all directions. Its elongation at break amounted to 100 to 150%. After having reached the yield point the stress-elongation curve did not fall but became a horizontal line or ascended slightly (cf. curves 3 of the graph). The films so obtained also possess a relatively high elongation under impact load.

*Example 8*

A tube of low pressure polyethylene (crystallite melting point 128° C.) which had an outside diameter of 50 mm. and a wall thickness of 2 mm. was prepared on a screw extruder. The tube leaving the sizing installation of the extruder was conducted to a tempering bath by means of a drawing-off device and tempered to 127° C. The tube was then passed through a short pre-heating bath where it was heated from the outside for another minute to 130° C. When leaving the bath it was spherically inflated with air having a temperature of 140° C. until the diameter amounted to 500 mm. (wall thickness about 20μ) and simultaneously the transition zone was blown with air of 140° C. The film thus obtained had a yield point (no more distinct) at 400 to 500 kg./sq. cm. (cf. curves 4 of the graph) and an elongation at break of 70 to 100%

*Example 9*

The experiment was carried out in the manner described in Example 8 with the exception that the previous bath had a temperature of 160° C. and the tube was passed through it within 30 seconds. The air used for expanding and blowing the tube had a temperature of about 160° C. A film formed which had δ-ε-curves corresponding to curves 3 of the graph.

When the temperature of the air with which the tube was inflated and/or blown was further elevated, for example, to 200° C., films were obtained the stress-elongation curves of which corresponded to curves 2 of the graph.

We claim:

1. In the process for the production of a thermoplastic film having multiaxial orientation by spherically expanding a heated tubular section of thermoplastic orientable material by internal pressure to effect orientation, progressively hemispherically expanding said tubular section, and subsequently cooling the oriented expanded section to set the orientation, said cooling being effected in a confining means which prevents further radial expansion, the improvement wherein prior to the expansion one concentrical part of the cross-sectional area of the tube is brought to a temperature within the range between the crystallite melting point of the thermoplastic material and 60° C. below said point, the other concentrical part of the cross-sectional area of said tube is brought to the molten state having a temperature in the range between the crystallite melting point and a temperature above the crystallite melting point and said temperatures are maintained during expansion.

2. A process according to claim 1 in which the thermoplastic material is an olefin polymer.

3. A process according to claim 1 in which the thermoplastic material is polyethylene.

4. A process according to claim 1 in which one concentrical part of the cross-sectional area of a tube coming out of an extruder in the molten state is cooled down to a temperature in the range between the crystallite melting point and about 60° C. thereunder.

References Cited in the file of this patent

UNITED STATES PATENTS

| | | |
|---|---|---|
| 2,461,975 | Fuller | Feb. 15, 1949 |
| 2,641,022 | Kress | June 9, 1953 |
| 2,987,767 | Berry et al. | June 13, 1961 |

FOREIGN PATENTS

| | | |
|---|---|---|
| 231,060 | Australia | Oct. 14, 1960 |
| 590,760 | Canada | Jan. 12, 1960 |